United States Patent
Lakshmanamurthy et al.

(10) Patent No.: US 7,505,410 B2
(45) Date of Patent: Mar. 17, 2009

(54) METHOD AND APPARATUS TO SUPPORT EFFICIENT CHECK-POINT AND ROLE-BACK OPERATIONS FOR FLOW-CONTROLLED QUEUES IN NETWORK DEVICES

(75) Inventors: Sridhar Lakshmanamurthy, Sunnyvale, CA (US); Sanjeev Jain, Shrewsbury, MA (US); Gilbert Wolrich, Framingham, MA (US); Hugh Wilkinson, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 11/173,005

(22) Filed: Jun. 30, 2005

(65) Prior Publication Data
US 2007/0008985 A1    Jan. 11, 2007

(51) Int. Cl.
*G08C 15/00* (2006.01)
*H04L 12/56* (2006.01)
*H04L 12/54* (2006.01)
*G06F 3/00* (2006.01)

(52) U.S. Cl. .................. 370/235; 370/413; 370/429; 710/54

(58) Field of Classification Search .......... 710/52, 710/54
See application file for complete search history.

(56) References Cited

U.S. PATENT DOCUMENTS 6,381,659 B2 *  4/2002  Proch et al. ............... 710/57
6,594,263 B1 *  7/2003  Martinsson ............ 370/395.42
6,714,562 B1 *  3/2004  Calvignac et al. ........... 370/474
2001/0054121 A1 * 12/2001 Proch et al. ................. 710/57
2002/0044563 A1 *  4/2002 Magill et al. ............... 370/411
2004/0158795 A1 *  8/2004 Carnevale et al. ........... 714/763
2004/0218592 A1 * 11/2004 Nagar et al. ................. 370/381
2006/0140203 A1 *  6/2006 Jain et al. .................... 370/412
2006/0212563 A1 *  9/2006 Boyd et al. .................. 709/223
2006/0268913 A1 * 11/2006 Singh et al. ................. 370/412

* cited by examiner

*Primary Examiner*—Hassan Kizou
*Assistant Examiner*—Ryan C Kavleski
(74) *Attorney, Agent, or Firm*—Blakely, Sokoloff, Taylor & Zafman LLP (57) ABSTRACT

Method and apparatus to support efficient check-point and role-back operations for flow-controlled queues in network devices. The method and apparatus employ queue descriptors to manage transfer of data from corresponding queues in memory into a switch fabric. In one embodiment, each queue descriptor includes an enqueue pointer identifying a tail cell of a segment of data scheduled to be transferred from the queue, a schedule pointer identifying a head cell of the segment of data, and a commit pointer identifying a most recent cell in the segment of data to be successfully transmitted into the switch fabric. In another embodiment, the queue descriptor further includes a scheduler sequence number; and a committed sequence number that are employed in connection with transfers of data from queues containing multiple segments. The various pointers and sequence numbers are employed to facilitate efficient check-point and roll-back operations relating to unsuccessful transmissions into the switch fabric.

16 Claims, 10 Drawing Sheets

| Enqueue pointer (updates tail) (Enq) |
|---|
| Schedule pointer (non-binding head update) (Sched) |
| Queue counter (Qcnt)/scheduler cell count (SCcnt) |
| Commit pointer (binding head update) (Cmt) |
| Committed cell count (Cmtcnt)/roll-back flag (F) |
| Mode/queue status/misc (Mode) |

| Enqueue pointer (updates tail) (Enq) |
|---|
| Schedule pointer (non-binding head update) (Sched) |
| Queue counter (QCnt)/scheduler cell count (SCcnt) |
| Commit pointer (binding head update) (Cmt) |
| Committed cell count (Cmtcnt)/roll-back flag (F) |
| Mode/queue status/misc (Mode) |
| Scheduler sequence #(Sseq#)/committed sequence #(Cseq#) |

METHOD AND APPARATUS TO SUPPORT EFFICIENT CHECK-POINT AND ROLE-BACK OPERATIONS FOR FLOW-CONTROLLED QUEUES IN NETWORK DEVICES

The field of invention relates generally to networking equipment and, more specifically but not exclusively relates to techniques for supporting efficient check-point and role-back operations for flow-controlled queues in network devices.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are generally referred to as "packet processing" or "packet forwarding" operations.

Modern network processors perform packet processing using multiple multi-threaded processing elements (e.g., processing cores) (referred to as microengines or compute engines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in external dynamic random access memory (DRAM)-based stores.

Figure 1:
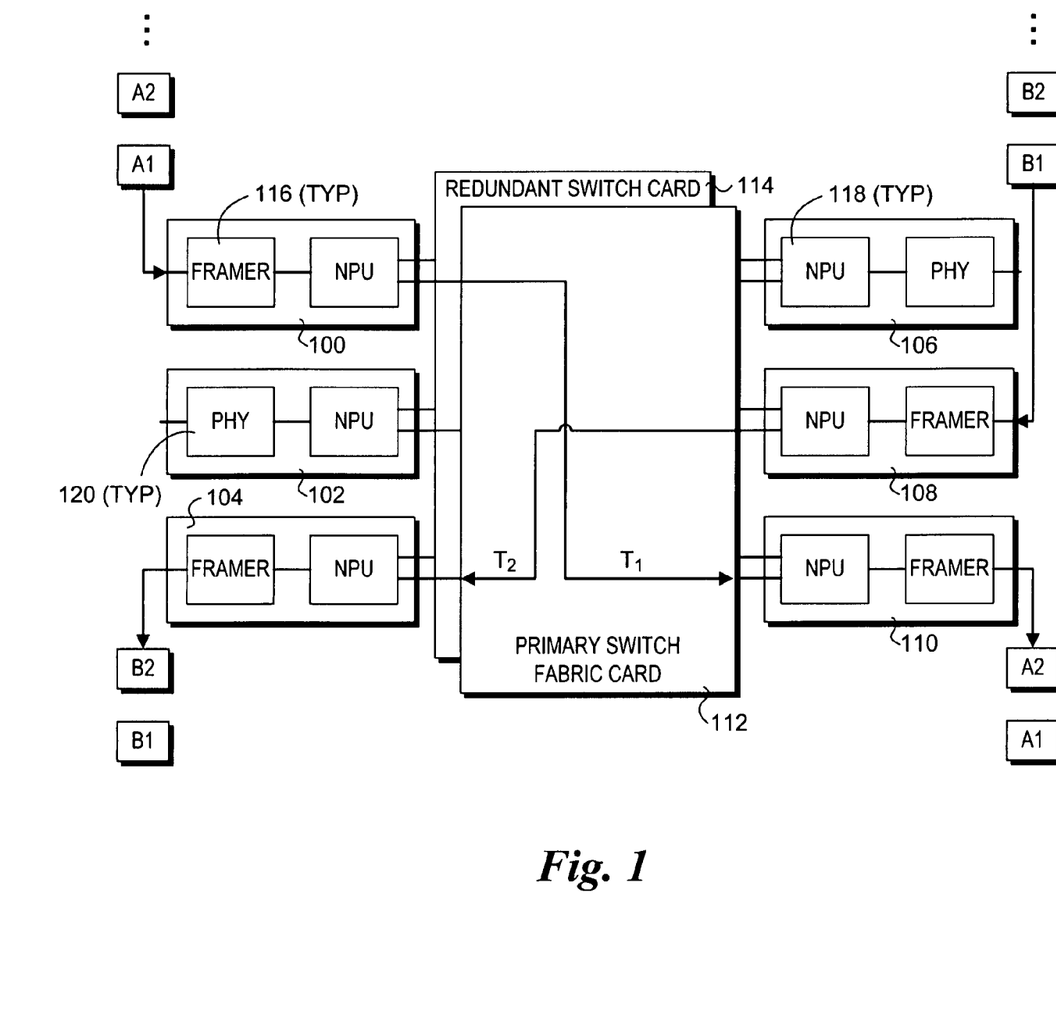
FIG. 1 is a schematic diagram of a network device including multiple line cards that are cross-connected using primary and redundant switch fabric cards.

A typical network device configuration is shown in FIG. 1. The network device includes six network line cards 100, 102, 104, 106, 108, and 110, which are communicatively-coupled to one another via a primary fabric switch card 112 and a redundant switch card via a common backplane, mid-plane, or the like. For simplicity, each of line cards 100, 104, 108 and 110 are depicted as including a framer block 116 and an NPU 118, while each of line cards 102 and 106 including a PHY block 120 and an NPU 118. The framer blocks 116 perform de-framing operations on incoming packets and framing operations for outgoing packets. Similarly, PHY blocks 120 perform various physical layer operations pertaining to incoming and outgoing packet processing. In addition to these illustrated components, each of the network line cards will include other common components, such as SRAM stores, DRAM stores and various other packet-processing blocks that are well-known in the art.

The purpose of primary fabric switch card 112 (and redundant switch card 114 when activated to replace primary fabric switch card 112) is to provide selective connectivity between the various network line cards. Each of the network line cards includes (generally) one or more physical input/output (I/O) ports via which data may be received and/or transmitted. In view of routing aspects common to routers and switches, the switch fabric enables packets or the like received at a first I/O port to be selectively routed to any of the other I/O ports by selectively coupling appropriate line cards hosting the I/O ports. For example, a first packet flow A is shown as being received at line card 100, transmitted across fabric switch card 112 to line card 110 at time T1, and henceforth transmitted to a next hop in the route. Similarly, a second packet flow B is shown as being received at line card 108, transmitted across fabric switch card 112 to line card 104 at time T2.

Due to the switching flexibility of the switch fabric, connections between line card pairs to support corresponding flows are frequency switched on an ongoing basis, requiring a scheduling mechanism to be employed for managing access to the switch fabric. Accordingly, switch fabrics employ fabric interfaces such as SPI (System Packet Interface), CSIX (Common Switch Interface), NPSI (Network Processor Streaming Interface) and ASI (Asynchronous Serial Interface) to interface with the NPUs in order to coordinate and schedule traffic flows. These fabric interfaces support fine-grained QoS (Quality of Service) by supporting flow control on the interface on a per-queue basis. These queues are optionally referred to as virtual output queues (VOQ) or connection queues (CQ). The flow control on these queues change rapidly based on the congestion in the fabric due to traffic injected from the various line cards. The fabric conveys Xoff and Xon messages to the line cards to stop and start traffic on a per queue basis. The network processors on the line cards are required to respond to these messages and stop or start transmission instantly on a particular queue.

A network processor typically requires a long latency from the time a given queue is scheduled to the time the data is actually transmitted on the wire. This is to account for the latency of the various internal pipeline stages and the latency to read data from external DRAM memory. Since the fabric flow control status changes rapidly, the NPU transmit engine is required to check whether the scheduled queue is still valid for transmission. If the transmit engine encounters an Xoff message, the scheduled cell/segment must not be transmitted, since the flow control status for that particular queue has changed in the intervening time. Under such conditions the transmitter will discard all the scheduled cell/segment from that queue. As a result, the queue management engine is required to roll-back the queue to the point where the first dropped segment occurred. Under the conventional approach, this is a costly operation (in terms of overhead latencies in memory resource consumption).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for supporting efficient check-point and role-back operations for flow-controlled queues in network devices are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments described below, techniques are disclosed for supporting efficient check-point and role-back operations for flow-controlled queues in network devices. Through use of novel queue descriptors, the techniques enable role-back and check-point operations to be performed with minimum overhead in terms of memory accesses and memory consumption. Additionally, the state of a given transfer can be easily ascertained via corresponding queue descriptor data.

In order to more clearly understand the features and advantages of the techniques, a discussion of a conventional scheme for management of flow-controlled queues will first be discussed. Details of the various embodiments of the invention then follow.

Figure 2:
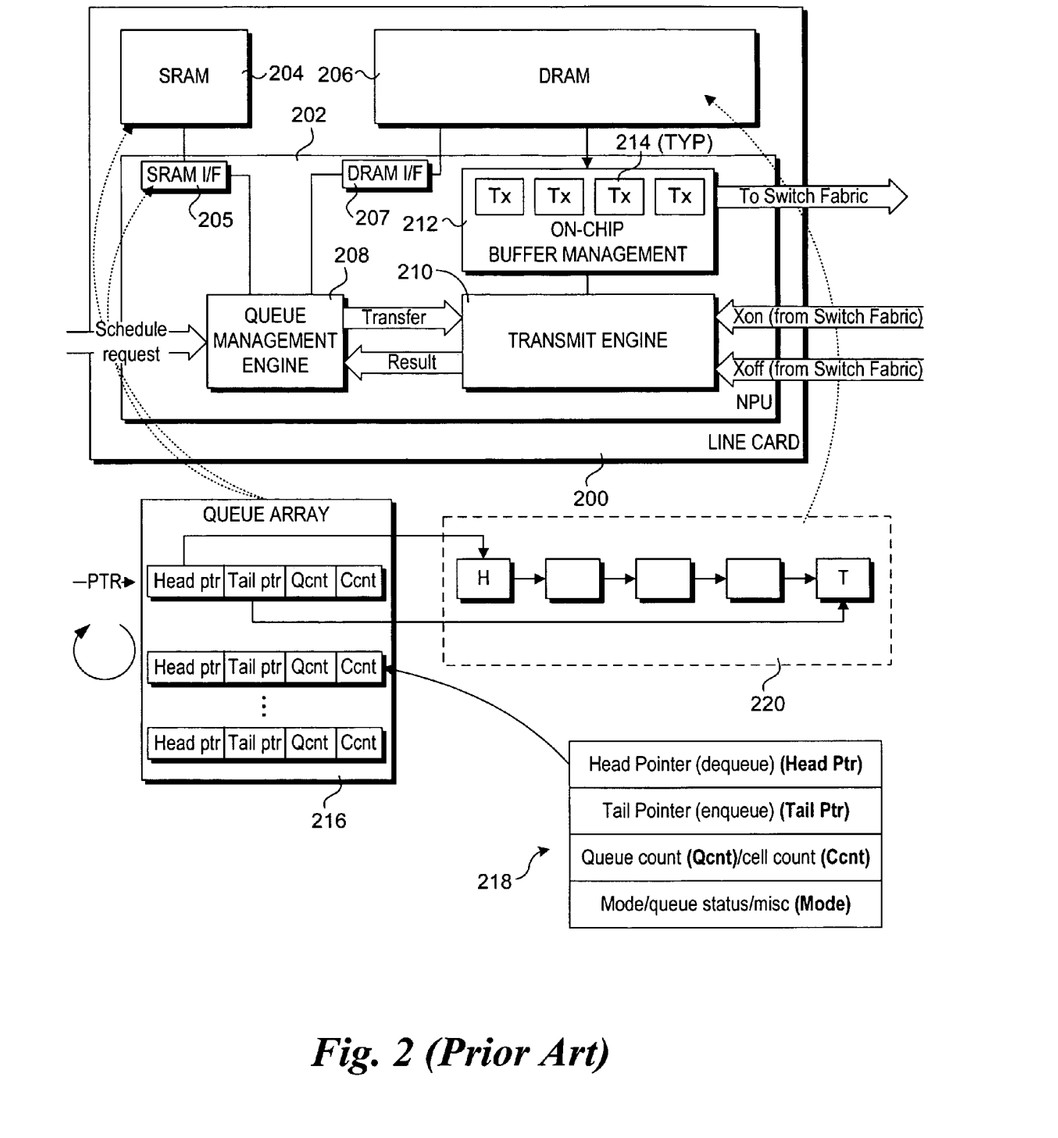
FIG. 2 is a schematic diagram illustrating queue management operations using a conventional scheme.

FIG. 2 shows various components used for performing management of flow-controlled queues in connection with line card and NPU operations performed in conjunction with packet-processing operations under a conventional approach. The components include a line card 200 including a NPU 202 coupled to an external SRAM store (SRAM) 204 and an external DRAM store (DRAM) 206 via respective SRAM and DRAM interfaces (I/F) 205 and 207. The NPU 202 includes a queue management engine 208 (alternatively referred to as the queue manager), a transmit engine 210, and on-chip buffer management unit 212 (alternatively referred to as the buffer manager). The queue management engine is used to manage various queues 214 stored in SRAM 204 and/or SRAM interface 205 in connection with transferring flows across the switch fabric. Transmit engine 210 is used to control transmission of flows into the switch fabric in response to transfer commands received from the queue management engine. On-chip buffer management unit 212 is used to manage the on-chip transfer (Tx) buffers 214 and coordinate transfer of data from DRAM 206 to the switch fabric.

To support queue management operations, queue management engine 208 maintains a queue array 216 containing multiple FIFO (first-in, first-out) queue array elements 218, which are also referred to as "queue descriptors." (In some implementations, the queue array elements are stored in the on-chip SRAM interface 205 for faster access and loaded from and unloaded to queue descriptors stored external SRAM 204.) Each queue descriptor includes a Head pointer (Ptr), a Tail pointer, a Queue count of the number of entries currently in the FIFO, and a Cell count (Cnt), as well as optional additional fields such as Mode and queue status, depicted as a Mode field herein for simplicity. Each queue descriptor is associated with a corresponding segment to be transferred, wherein the Head pointer points to the memory location (i.e., address) in DRAM 206 of the first (head) cell in the segment and the Tail pointer points to the memory location of the last (tail) cell in the segment, with the cells in between being stored at sequential memory addresses.

In response to receiving a packet, appropriate packet-processing operations are performed by NPU 202. The contents of each packet are buffered in receive buffers at the NPU's on-board media switch fabric interface (not shown). In further detail, the packet content is buffered using fixed size units referred to as "mpackets" or cells. Using a next available thread, the buffered cells are then copied into DRAM 206 and reassembled into packets. A handle to the packet content (e.g., pointers to start and end of the packet) is then written to a scratch ring or the like, which may be either stored on NPU 202 or in SRAM 204, depending on the implementation.

During ongoing packet-processing operations, various flows containing packets are scheduled for subsequent dispatch to the switch fabric, wherein the scheduled dispatch time is offset using a predetermined latency that coincides with the overall latency predicted to perform related transfer operations, including various internal pipeline stages and the latency to retrieve the packet payload from DRAM 206. In response to a schedule request received via corresponding packet-processing operations, queue management engine 208 appends a new queue descriptor 218 to queue array 216 (replacing the previous queue descriptor at the bottom of the queue array).

As each queue descriptor 218 reaches the top of queue array 216 (in practice, a circular pointer is used to identify the top of the queue rather than moving the queue descriptors), corresponding dequeue operations are initiated for the segment identified by that queue descriptor. This involves reading the cells for the segment from DRAM 206 and temporarily storing the cell data in transmit buffers 214 to be subsequently forwarded to an appropriate destination via the switch fabric. As discussed above, the process entails a predetermined latency and is performed using a pipelined processing sequence.

If there is sufficient bandwidth available within the switch fabric at the scheduled dispatch time (e.g., time for data in the transmit buffers to be transferred to the switch fabric), the various cells/segments in the transmit buffers are transferred to the switch fabric without any problem. However, there may not be sufficient bandwidth available at the time of dispatch, such that the transfer cannot be made, which will be indicated by an Xoff message received from the switch fabric indicating that traffic may not be injected into the switch fabric at this moment. In response to receiving an Xoff message, the scheduled cell/segment from the queue (now in transmit buffers 214) must be dropped. In conjunction with this event, the queue must be rolled back to the point where the first dropped segment occurred.

As discussed above, under the conventional scheme of FIG. 2 each queue descriptor includes a head pointer and a tail pointer. As a result, on a schedule request the committed state of the queue, i.e., the head pointer and cell count, must be updated. This requires complex bookkeeping in order to make sure that a roll-back request is implemented correctly. The transmit engine is required to send back the pointer of the cell that was the first aborted cell for that queue. The transmit engine and the queue management engine also need to coordinate to make sure that the cell count is restored to the correct value on a roll-back operation. With only two pointers, the implementation of a roll-back scheme is significantly complex and introduces a corresponding overhead penalty.

In accordance with embodiments of the invention now described, innovative queue descriptor formats are introduced that allow for efficient and elegant queue roll-back. The queue descriptor formats and related operations provide for unambiguous transfer state information without requiring the complex pointer manipulation employed by the foregoing conventional approach.

Figure 3A:
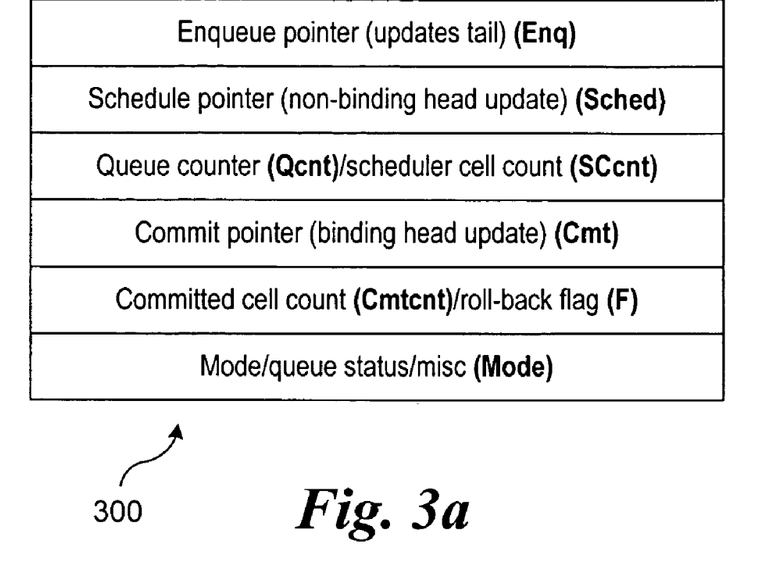
FIG. 3a shows a queue descriptor format including three pointers that collectively support efficient queue roll-back operations, according to one embodiment of the invention.

A queue descriptor format 300 corresponding to one embodiment is shown in FIG. 3*a*. The queue descriptor format includes an Enqueue pointer (Enq), a Schedule pointer (Sched), a Queue counter (Qcnt), a scheduler cell count (SC-cnt), a Commit pointer (Cmt), a Committed cell count (Cmtcnt), and a roll-back flag (F). Optional, mode, queue status, and/or miscellaneous fields may also be provided, as depicted by the Mode field.

Figure 4:
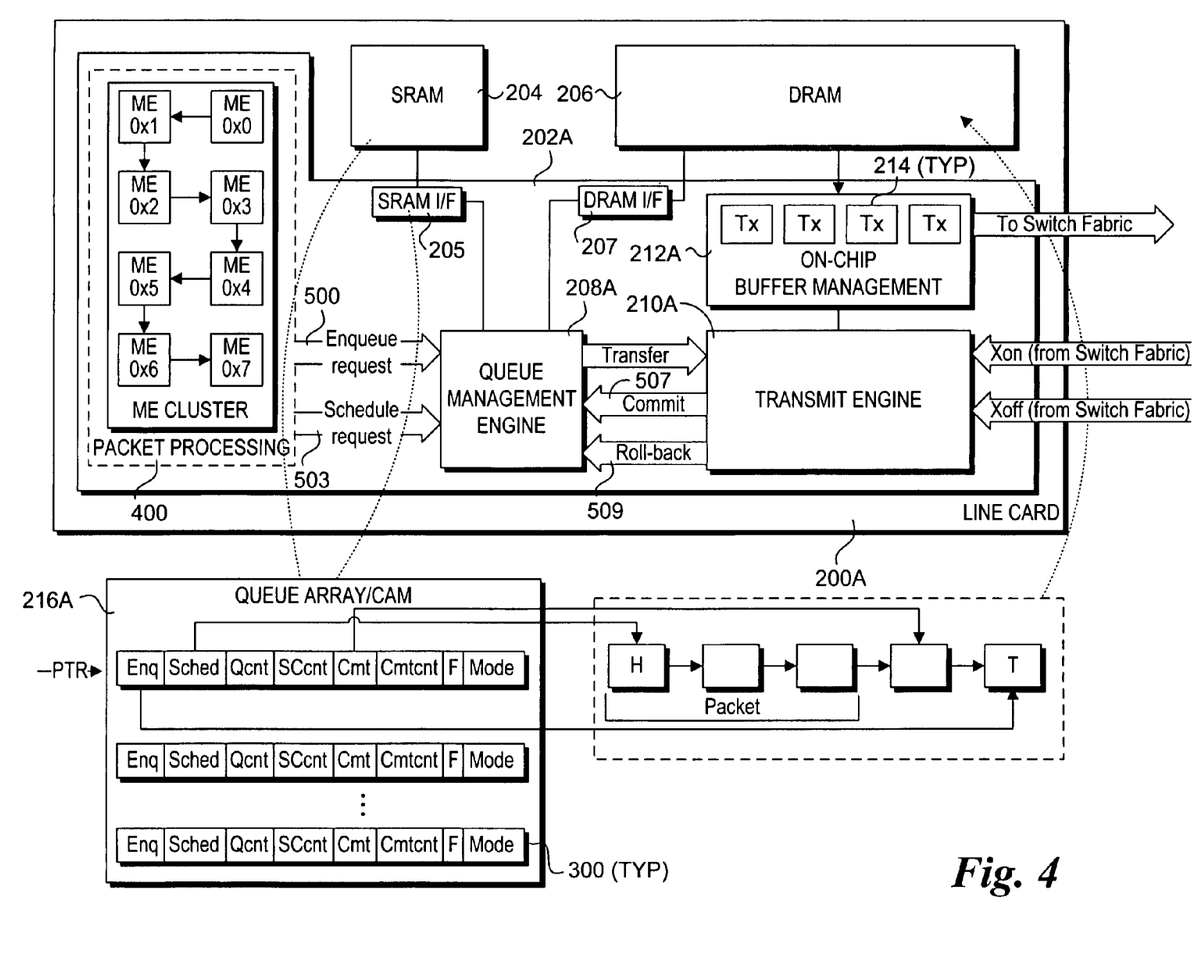
FIG. 4 is a schematic diagram illustrating selected components of a network processor unit and line card used in connection with the queue descriptor format of FIG. 3a to perform various queue management operations.

FIG. 4 shows an implementation of a plurality of queue descriptors 300 in a queue array/CAM 216A. In one embodiment, queue array/CAM 216A is implemented as a circular buffer (e.g., scratch ring) in the manner described above using the conventional approach of FIG. 2. In another embodiment, queue array/CAM 216 is implemented as a content addressable memory (CAM) that employs a least recently used (LRU) algorithm to determine which queue descriptor to evict when a new queue descriptor needs to be loaded into the CAM. As illustrated in this figure, the Enqueue pointer points to the tail cell in segment 220, while the Schedule pointer, which operates as a non-binding update to the head cell, points to the head cell. Meanwhile, the Commit pointer points to the most-recent cell that has been successfully transmitted into the switch fabric.

Figure 5:
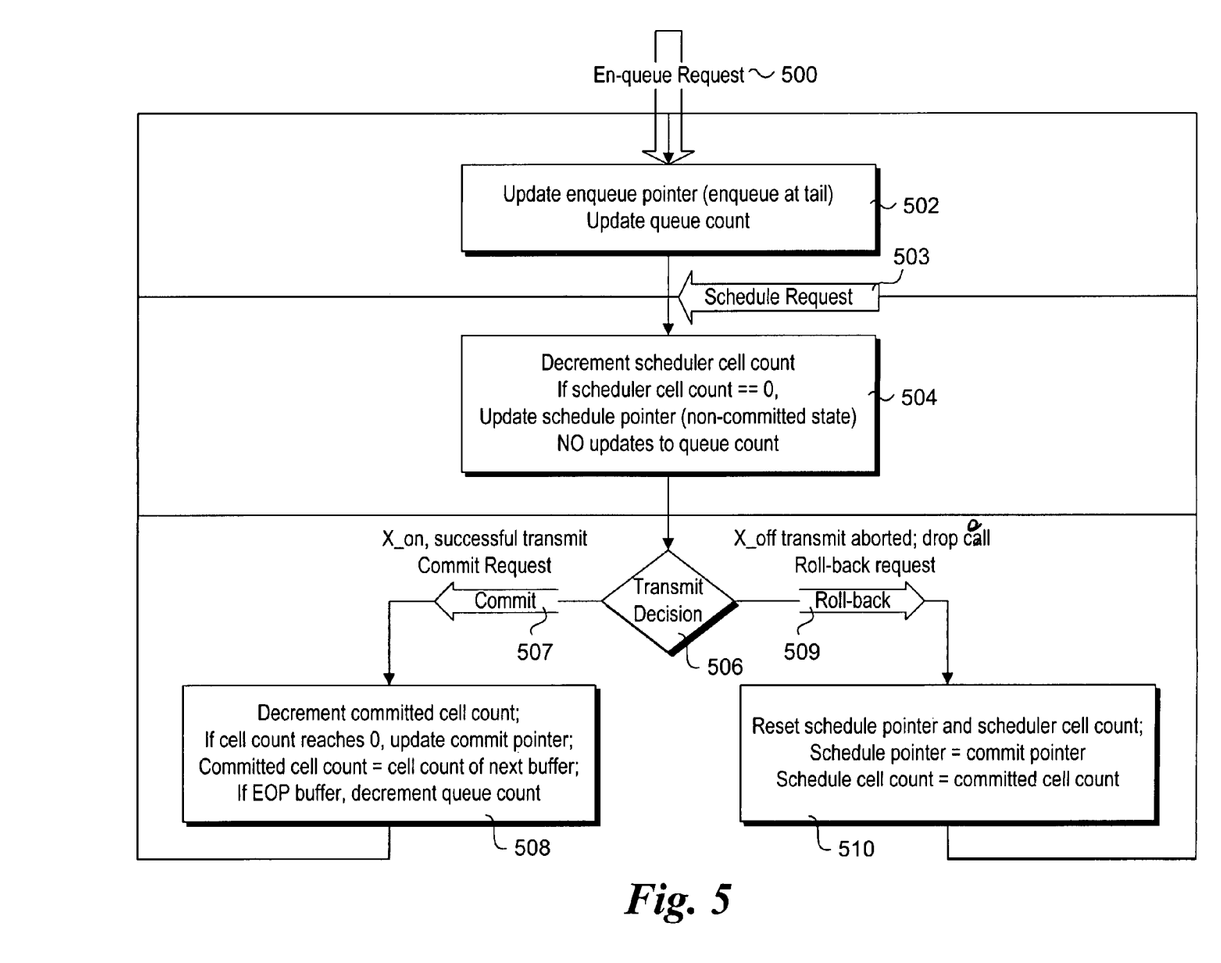
FIG. 5 is a flowchart illustrating various queue management operations performed using the architecture of FIG. 4 and queue descriptor format of FIG. 3a to facilitate transfer of data from the line card into a switch fabric.

FIG. 5 shows a flowchart illustrating queue management operations performed during on-going packet processing operations for the line card 200A of FIG. 4. At the top of the flowchart is an enqueue request 500, which is received from a packet-processing block 400 (FIG. 4). On an enqueue request, the new buffer or packet is enqueued at the tail of an existing queue assigned to the same flow or a new queue containing the buffer is added in the DRAM queue space and a corresponding queue descriptor is generated or updated (as applicable) such that its enqueue pointer points to the tail (cell) of the queue, as depicted in a block 502. The queue count is also updated to reflect the added queue.

When the scheduler picks a cell or segment to transmit, it sends a schedule request 503 to the queue management engine 208A. On a schedule request, the scheduler cell count is decremented by the number of cells scheduled to transmit, as depicted in a block 504. When the scheduler cell count is decremented to 0, all the cells from a buffer are scheduled, and the schedule pointer is updated to point to the head cell. Since the schedule request is not binding, the queue count is not updated.

As depicted by a decision block 506, once a cell is scheduled and injected into the transmit pipeline, two outcomes are possible. If transmit engine 210A successfully transmits the cell, it will return a commit request 402 to queue management engine 208. In response to a commit request, the queue management engine decrements the committed cell count, updates the commit pointer if the cell count reaches 0, and also decrements the queue count when the cell count reaches 0 for an EOP (end of packet) buffer, as depicted in a block 508.

If the transmit engine 210A encounters an Xoff flow control message, it will drop the cell, abort transmission on that queue and issue a roll-back request to queue management engine 208A. On receiving a roll-back request, queue management engine 208A will reset the schedule pointer and the scheduler cell count with the commit pointer and the committed cell count as shown in a block 510. As a result, the scheduler will start scheduling cells from the point at which transmit was aborted.

Figure 6A:
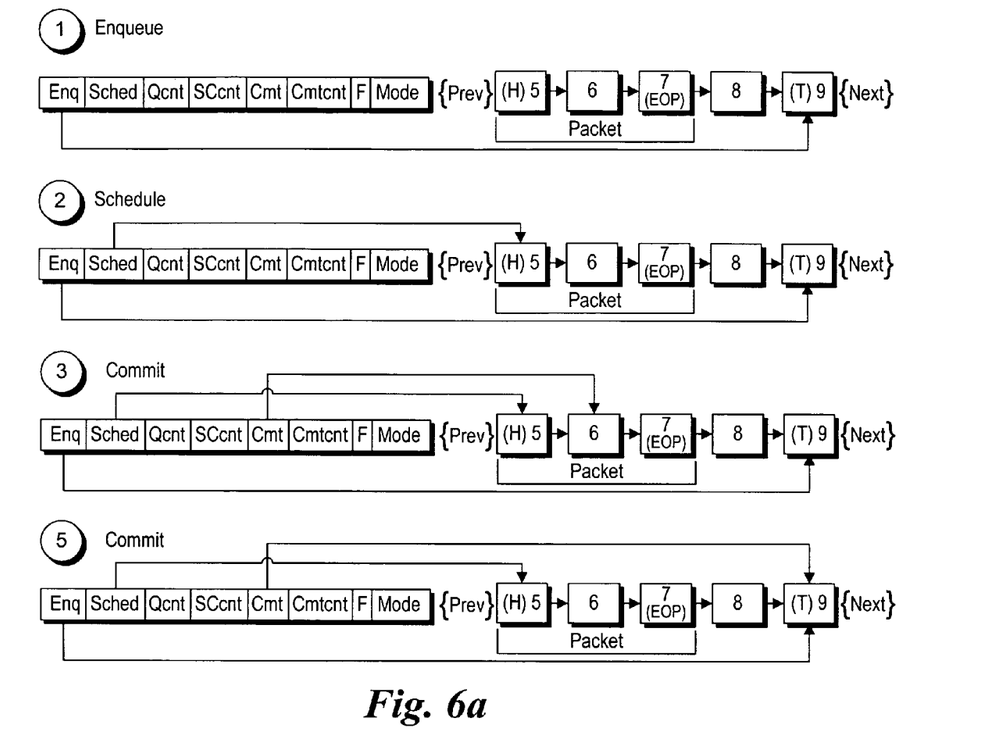
FIG. 6a shows a sequence of timeframes illustrative of the state of a queue descriptor during a successful data transmission operation under which multiple cells of data are transmitted to the switch fabric.
Figure 6B:
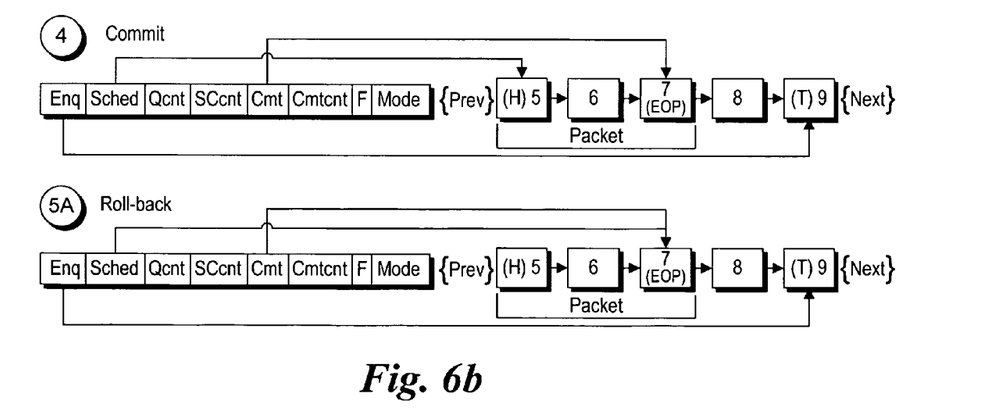
FIG. 6b shows a sequence of timeframes illustrative of the state of a queue descriptor during operations performed in connection with a roll-back scenario.

The foregoing operations are schematically illustrated in the exemplary timelines of FIGS. 6*a* and 6*b*. In each of FIGS. 6*a* and 6*b*, a segment including cells 5-9 is to be transferred across the switch fabric, with cell 5 being the head cell and cell 9 being the tail cell, and cell 7 corresponding to an end of packet (EOP). At a timeframe 1 (timeframes are depicted by encircled numbers) in FIG. 6*a*, an enqueue request is received by queue management engine 208A and processed. In response to the Enqueue request, the Enqueue pointer is updated to point to the tail cell (9).

At a timeframe 2, a schedule request is received and processed by queue management engine 208A. This results in the Schedule pointer being updated to point to the head cell (5). At timeframe 3, the transmission of the first two cells 5 and 6 (transmitted from the head end) into the switch fiber is successful. As a result, the Commit pointer is updated to point to cell 6. Subsequently cell 7 is successfully transmitted, which updates the Commit pointer again, as depicted by a timeframe 4 shown in FIG. 6*b*. Returning to FIG. 6*a* to illustrate a first scenario, at a timeframe 5 the entire segment has been successfully transmitted into the switch fiber. Accordingly, the Schedule pointer and the Commit pointer are now pointing to the tail cell (9).

The timeframes in FIG. 6*b* depict a roll-back scenario. Recall from above that the objective is to transfer all of the cells in the segment. As before, at timeframe 4 cells 5, 6, and 7 have been successfully transmitted, and thus the Commit pointer points to cell 7, while the Schedule pointer remains at the head cell 5. Also at this point, the scheduler cell count value has been decremented to 2, indicating two more cells (8 and 9) need to be transferred. At time frame 5A, a roll-back event occurs in response to an Xoff signal received from the switch fabric indicating it is unavailable for input transmission. As a result, the Schedule pointer is rolled back to point to cell 7, the last cell that was successfully transmitted. This action rolls back the queue descriptor to indicate the last successful transfer state. During a subsequent iteration, a new schedule request will be issued to schedule transfer of the remaining cells 8 and 9. Since the data has already been enqueued, there is no need to change the tail Enqueue pointer for the queue descriptor.

As a result of using the foregoing innovative queue descriptor format, the operation of the queue management engine is streamlined. The various operations—enqueue, schedule, commit and roll-back are easy to implement and validate. The indication/notification from the transmit engine is also streamlined into a single message class—successful transmit and transmit abort.

Under current mid-range and high-end NPU space, the number of fabric queues supported (typically referred to as ingress queues) ranges from 256-4096 queues. In most implementations, an attempt is made to support the ingress queuing engine and the ingress queue descriptors on-chip (e.g., using an on-chip SRAM scratch ring or the like). In such implementations, the additional bandwidth required to maintain a third set of pointers in the queue descriptor is a non-issue. For instance, in order to support 4K queues, the high-end NPU is required to allocate 96 KB of storage for the enhanced queue descriptors.

Status Based Flow Control Implementation

Under another embodiment presented below, an extension to queue descriptor format 300 is employed to further address status-based flow control (SBFC). Next generation switch fabrics, such as Advanced Switching (AS), support fine-grained flow control across the various line cards using SBFC. The SBFC flow control messages, Xon and Xoff, are defined on a per connection queue (CQ) basis. This allows the line cards to manage transmission by scheduling the appropriate fine-grained queues and avoid downstream congestion. Line cards and AS end points need to meet stringent response time requirement for Xoff and Xon messages. For example, when an Xoff message is received, the AS end point is required to stop transmission on that queue within 250 ns.

Typically, AS end-points have queues in external memory. As a result, the first stage of scheduling incurs a long latency from the time a given queue is scheduled to the time the data is actually transmitted on the wire, similar to that described above. Since the SBFC status changes rapidly, the end-point is required to support on-chip buffering for the segments scheduled by a primary scheduler. A secondary scheduler subsequently schedules segments from the on-chip connection queue for final transmission. Since the secondary scheduler deals with only on-chip state, it is expected to have a fast turn-around time to respond to SFBC Xon and Xoff messages for that particular connection queue in a timely manner and conform to the tight requirements specified in the specification for the SBFC response time. When the secondary scheduler encounters an Xoff message for a particular queue, it will drop that segment and will issue a roll back request to that queue. The primary scheduler will then reschedule these segments. Since there can be several subsequent segments from that queue in the pipeline, the transmit engine must continue to drop all subsequent segments until the queue is rolled back and rescheduled. This increases the roll-back complexity and bookkeeping.

Figure 3B:
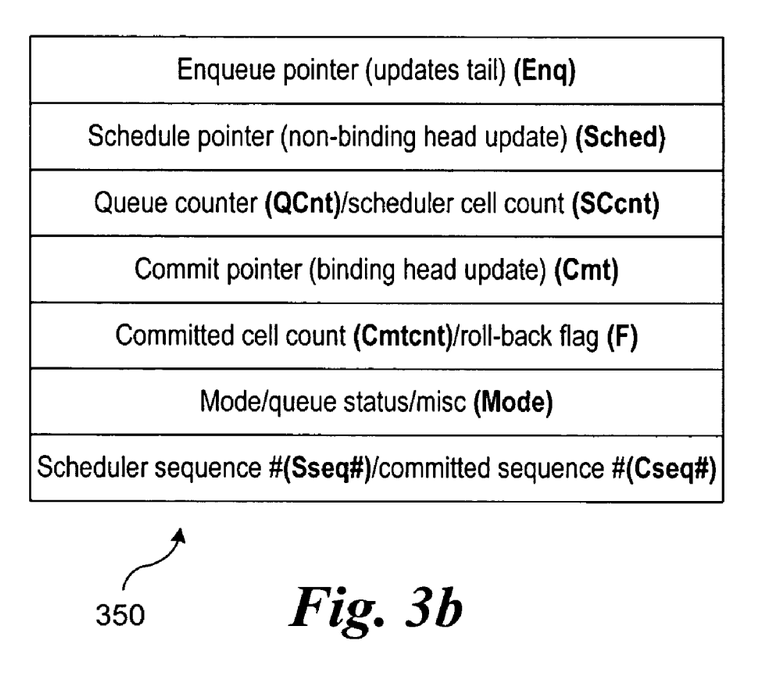
FIG. 3b shows a queue descriptor format including the fields of the queue descriptor format of FIG. 3a plus Scheduler sequence # and committed sequence # fields.

A queue descriptor format 350 including a sequence number to support efficient check-point and roll-back operations is shown in FIG. 3b. In addition to the parameters present in queue descriptor format 300, this queue descriptor adds a two-part sequence number including a Scheduler sequence number (#) (Sseq#) and a committed sequence # (Cseq#). The queue descriptor format 350 is used to implement the handshake between the queue management engine, the on-chip buffer management unit and the transmit engine for the check-point and rollback of flow controlled queues and to track successful transmission of the segment for non-blocking queues. Under this approach, the Scheduler sequence # and the committed sequence # are tracked and managed by state machines in the queue management engine and the buffer management unit.

Figure 7:
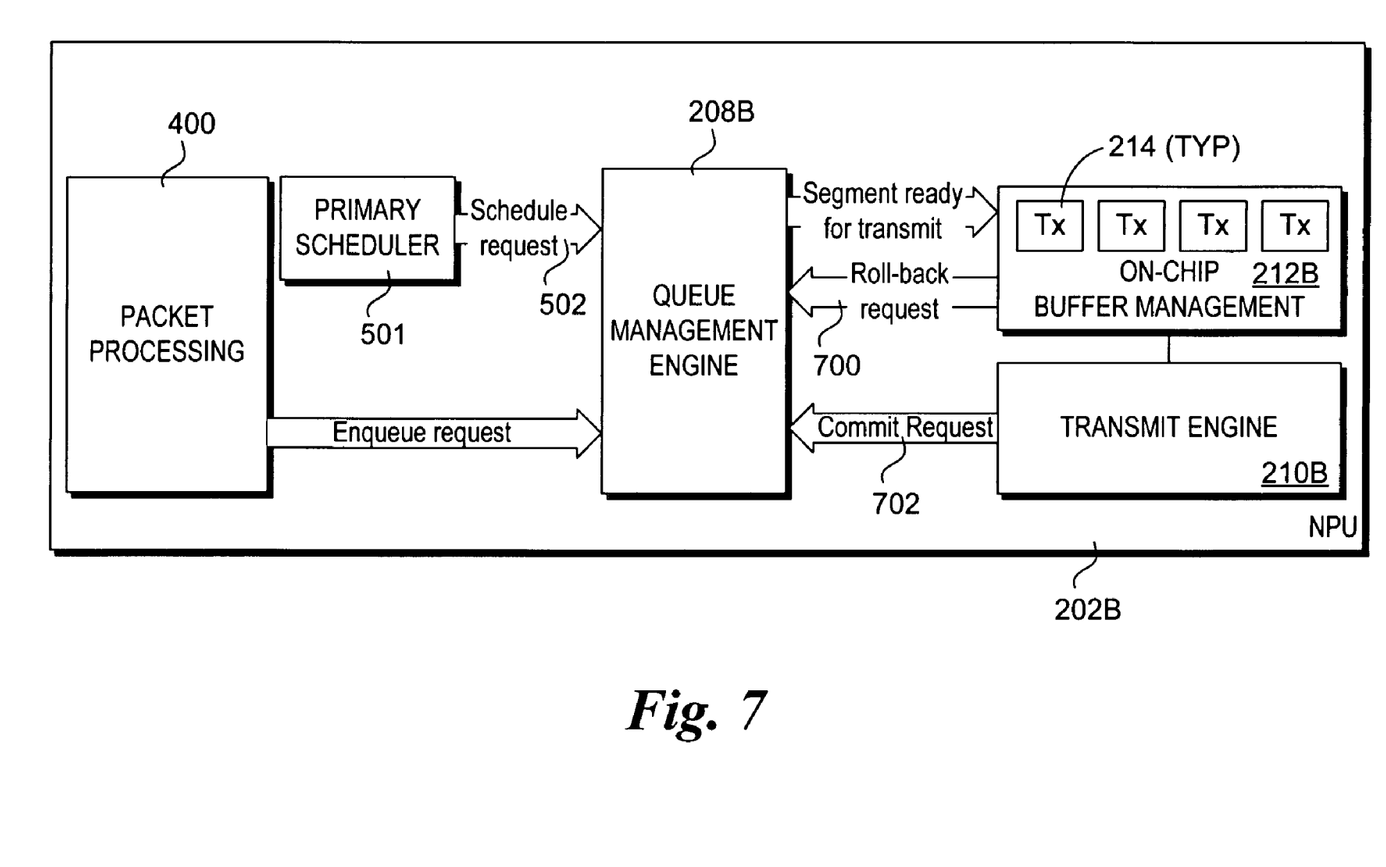
FIG. 7 is a schematic diagram illustrating selected components employed in connection with the queue descriptor format of FIG. 3b to support check point and roll-back operations.

FIG. 7 shows the high-level interaction between the various functional blocks of an NPU 202B to support the queue-management, check-point, and roll-back features facilitated by queue descriptor format 350. The selected elements of the NPU illustrated in FIG. 7 include a packet processing block 400, a primary scheduler 501, a queue management engine 208B, an on-chip buffer management unit 212B, and a transmit engine 210B. The primary scheduler 501 uses multiple inputs and scheduling algorithms such as weighted fair-queuing (WFQ), weighted round-robin (WRR) or round-robin to determine a segment that is ready for transmit. The scheduler then issues a schedule request 502 to queue management engine 208B. In response to a schedule request, the queue management engine will decrement the scheduler cell count field in queue descriptor 350, and will increment the scheduler sequence number. If the cell count is 0, then the scheduler pointer is also updated to point to the next buffer in the queue. A separate data management engine (not shown) will fetch the data associated with this particular segment from the external DRAM unit and move it into an on-chip transmit buffer 214. The queue management engine 208B will also communicate the following information to on-chip buffer management unit 212B for each segment that is scheduled for transmission:

1. Pointer to the buffer that the cell belongs to;
 2. Scheduler sequence #; and
 3. SOP (start of packet) and EOP indication.

Initially the queue state in the on-chip buffer will be "ready for transmit."

The on-chip buffer management unit 212B will perform garbage collection on the segments allocated and periodically determine segments that need to be dropped due to Xoff flow control asserted for those particular queues. Once the buffer manager determines that a particular queue is marked for packet drop, the buffer manager coordinates with the queue manager to check-point and roll-back the queue such that segments from that queue are rescheduled at a later time. The sequence of operations for check-point and roll-back and successful transmission are schematically illustrated in the flowcharts of FIGS. 8 and 9, respectively.

Figure 8:
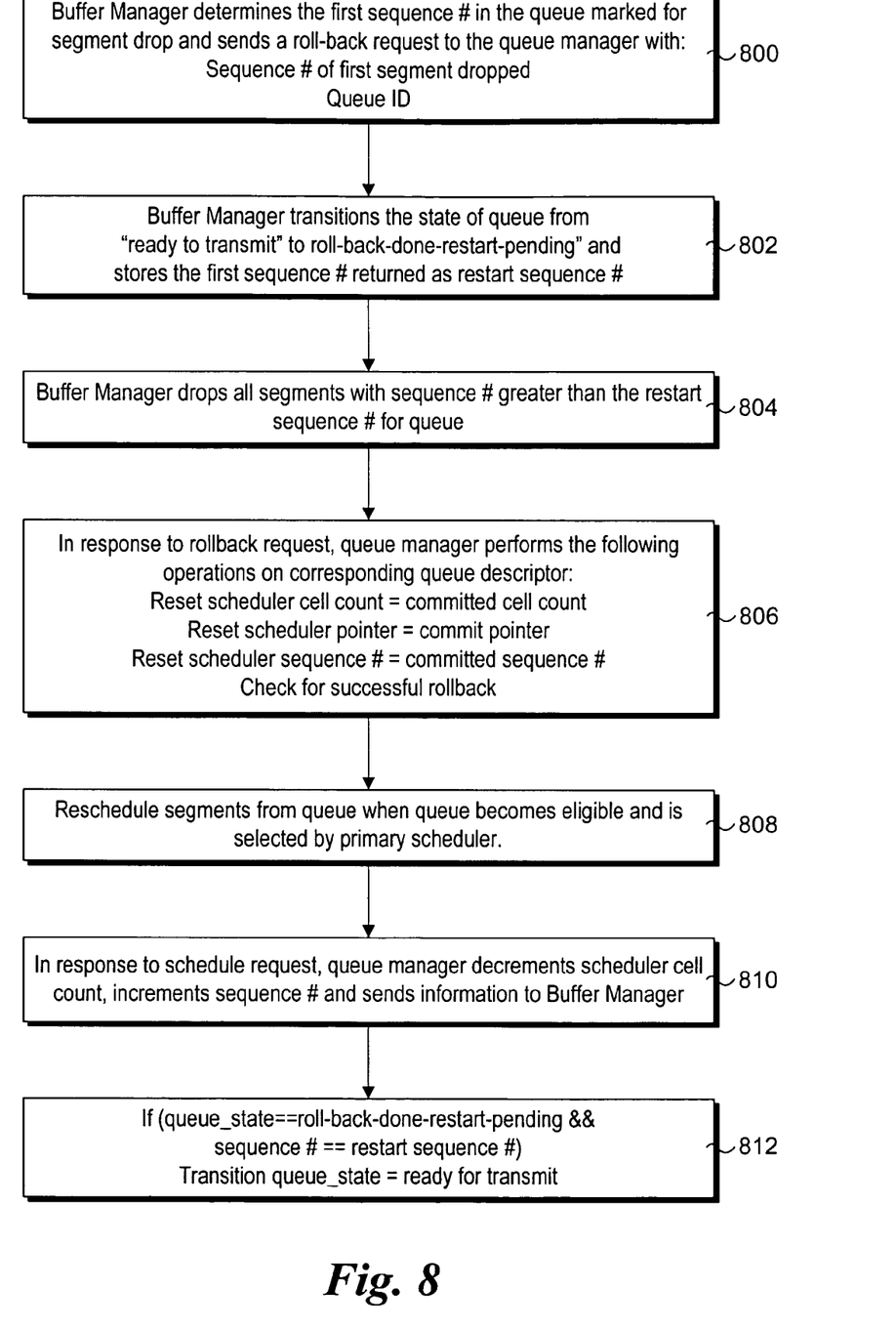
FIG. 8 is a flowchart illustrating operations performed by the architecture of FIG. 7 using the queue descriptor format of FIG. 3b under a roll-back scenario.
Figure 9:
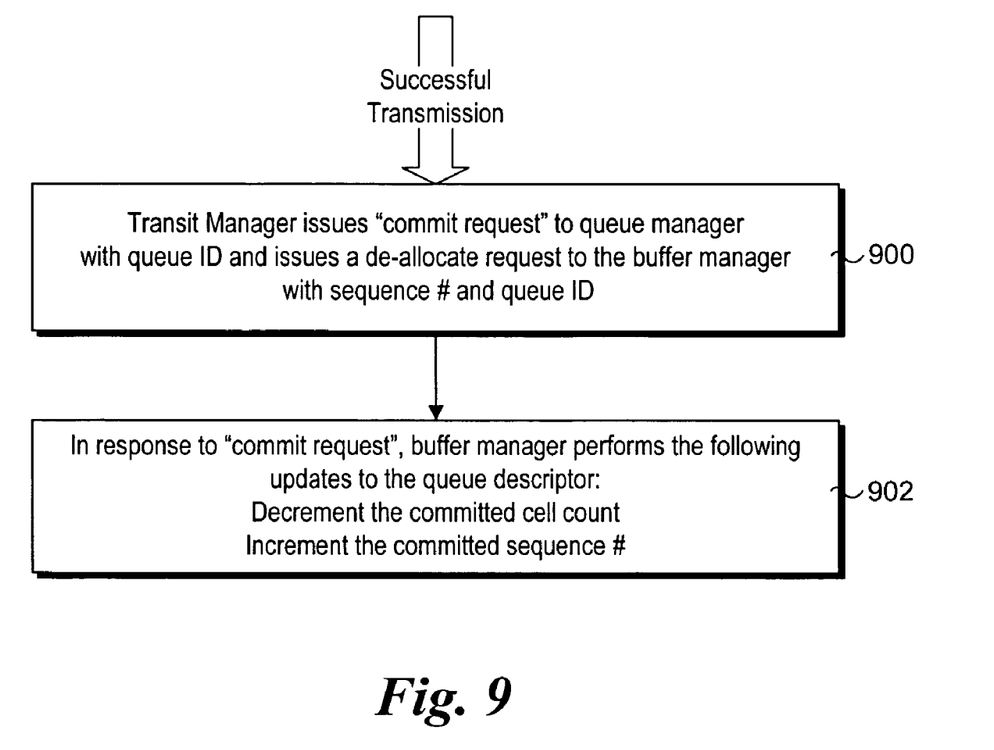
FIG. 9 is a flowchart illustrating operations performed by the architecture of FIG. 7 using the queue descriptor format of FIG. 3b under a successful transmission scenario.

With reference to the flowchart of FIG. 8, the check-point and roll-back process begins in a block 800, wherein the buffer manager determines the first sequence # in the queue marked for segment drop and sends a roll-back request 702 to the queue manager including the sequence # of the first segment that is dropped and the queue ID.

In a block 802, the buffer manager transitions the state of that particular queue from "ready to transmit" to "roll-back-done-restart-pending" and also stores the first sequence # that was returned as the restart sequence #. This is the sequence # that will be resubmitted by the queue manager once that queue becomes eligible for re-scheduling.

Once the queue state for a particular queue is "roll-back-done-restart-pending," then all segments of that queue with a sequence # greater than the restart sequence # will be dropped by the buffer management unit 212B, as depicted in a block 804. Thus, using this simple and elegant sequence # scheme, all buffer as well as in-flight segments for that particular queue are dropped. Segments for a dropped queue can still be in flight due to the long latency between the primary scheduler and the arrival of data into the on-chip buffer.

In response to roll-back request 702, the queue management engine 208B performs the following operations in a block 806: The scheduler cell count is reset to equal the committed cell count; the scheduler pointer is reset to equal the committed pointer; and the scheduler sequence # is reset to equal the committed sequence #. In addition, a check of successful rollback is made. For example, an error is identified by the following logic in one embodiment:

if (returned sequence #!=committed sequence #+1); return error.

In a block 808, the segments from the queue are rescheduled when the queue becomes eligible and is selected by primary scheduler 501. In response to the schedule request, the queue management engine 208B decrements the scheduler cell count, increments the sequence #, and sends the information to buffer management unit 212B. When this unit receives a segment for a queue in "roll-back-done-restart-pending" and the received sequence # is the restart sequence #, then the queue state transitions again to "ready for transmit," as depicted in a block 812.

With reference to the flowchart of FIG. 9, the sequence of operations performed by the buffer manager, transmit manager and the queue manager for segments that are successfully transmitted are as follows. Once the transmit manager successfully transmits a segment scheduled from the transmit buffer, it issues a commit request 704 to the queue manager with the queue ID information in a block 900. It also issues a de-allocate request to the buffer manager with the sequence # and the queue ID information. In response, the buffer manager updates the queue descriptor in a block 902 by decrementing the committed cell count and incrementing the committed sequence #. As a result, the committed state of the queue reflects the actual segments successfully transmitted by the end-point device.

Figure 10:
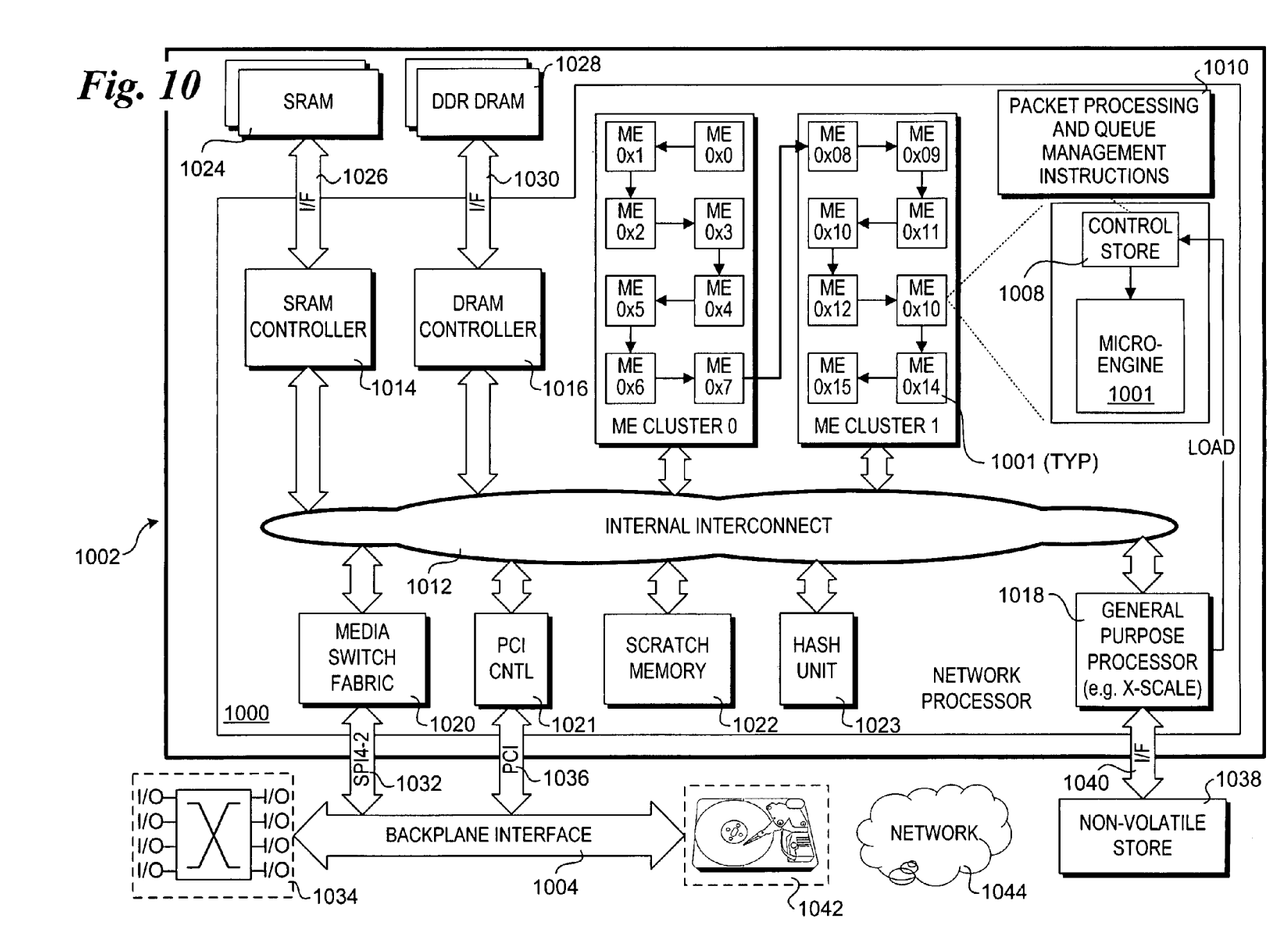
FIG. 10 is a schematic diagram of a line card including a network processor unit that implements various aspects of the embodiments described here.

FIG. 10 shows an exemplary implementation of a network processor 1000 that includes one or more compute engines (e.g., microengines) that may be used to execute instruction threads to perform the queue management and related data transfer operations discussed herein. In this implementation, network processor 1000 is employed in a line card 1002. In general, line card 1002 is illustrative of various types of network element line cards employing standardized or proprietary architectures. For example, a typical line card of this type may comprises an Advanced Telecommunications and Computer Architecture (ATCA) modular board that is coupled to a common backplane in an ATCA chassis that may further include other ATCA modular boards. Accordingly the line card includes a set of connectors to meet with mating connectors on the backplane, as illustrated by a backplane interface 1004. In general, backplane interface 1004 supports various input/output (I/O) communication channels, as well as provides power to line card 1002. For simplicity, only selected I/O interfaces are shown in FIG. 10, although it will be understood that other I/O and power input interfaces also exist. In one embodiment, the I/O interfaces support use in an AS environment.

Network processor 1000 includes n microengines 1001. In one embodiment, n=8, while in other embodiment n=16, 24, or 32. Other numbers of microengines 1001 may also me used. In the illustrated embodiment, 16 microengines 1001 are shown grouped into two clusters of 8 microengines, including an ME cluster 0 and an ME cluster 1.

In the illustrated embodiment, each microengine 1001 executes instructions (microcode) that are stored in a local control store 1008. Included among the instructions for one or more microengines are packet processing and queue management instructions 1010 that are employed to facilitate the various packet processing and queue management operations described herein. In one embodiment, these instructions are written in the form of microcode macros.

Each of microengines 1001 is connected to other network processor components via sets of bus and control lines referred to as the processor "chassis". For clarity, these bus sets and control lines are depicted as an internal interconnect 1012. Also connected to the internal interconnect are an SRAM controller 1014, a DRAM controller 1016, a general purpose processor 1018, a media switch fabric interface 1020, a PCI (peripheral component interconnect) controller 1021, scratch memory 1022, and a hash unit 1023. Other components not shown that may be provided by network processor 1000 include, but are not limited to, encryption units, a CAP (Control Status Register Access Proxy) unit, and a performance monitor.

The SRAM controller 1014 is used to access an external SRAM store 1024 via an SRAM interface 1026. Similarly, DRAM controller 1016 is used to access an external DRAM store 1028 via a DRAM interface 1030. In one embodiment, DRAM store 1028 employs DDR (double data rate) DRAM. In other embodiment DRAM store may employ Rambus DRAM (RDRAM) or reduced-latency DRAM (RLDRAM). Other types of DRAM may also be supported.

General-purpose processor 1018 may be employed for various network processor operations. In one embodiment, control plane operations are facilitated by software executing on general-purpose processor 1018, while data plane operations are primarily facilitated by instruction threads executing on microengines 1001.

Media switch fabric interface 1020 is used to interface with the media switch fabric for the network element in which the line card is installed. In one embodiment, media switch fabric interface 1020 employs a System Packet Level Interface 4 Phase 2 (SPI4-2) interface 1032. Optionally, media switch fabric interface 1020 may support a CSIX, NPSI and/or ASI interface. In general, the actual switch fabric may be hosted by one or more separate line cards, or may be built into the chassis backplane. Both of these configurations are illustrated by switch fabric 1034. In one embodiment, the media switch fabric interface includes transmit buffers 214 and provides logic to implement the operations of on-chip buffer management units 214A and 214B described herein.

PCI controller 1022 enables the network processor to interface with one or more PCI devices that are coupled to backplane interface 1004 via a PCI interface 1036. In one embodiment, PCI interface 1036 comprises a PCI Express interface.

During initialization, coded instructions (e.g., microcode) to facilitate various packet-processing and queue management functions and operations are loaded into control stores 1008. In one embodiment, the instructions are loaded from a non-volatile store 1038 hosted by line card 1002, such as a flash memory device. Other examples of non-volatile stores include read-only memories (ROMs), programmable ROMs (PROMs), and electronically erasable PROMs (EEPROMs). In one embodiment, non-volatile store 1038 is accessed by general-purpose processor 1018 via an interface 1040. In another embodiment, non-volatile store 1038 may be accessed via an interface (not shown) coupled to internal interconnect 1012.

In addition to loading the instructions from a local (to line card 1002) store, instructions may be loaded from an external source. For example, in one embodiment, the instructions are stored on a disk drive 1042 hosted by another line card (not shown) or otherwise provided by the network element in which line card 1002 is installed. In yet another embodiment, the instructions are downloaded from a remote server or the like via a network 1044 as a carrier wave.

In general, each of the functional blocks illustrated in the figures and discussed herein may be implemented using programmable logic in hardware, programmable logic in firmware/software via execution of corresponding threads on one or more compute engines, or a combination of the two. For example, in one embodiment the operations depicted for the queue management engines discussed herein are facilitated by executing corresponding queue manager threads on one or more compute engines in an NPU. These queue manager threads are used to update queue descriptors, as well as manage the states of various state machines. Similar techniques may be used for each of the primary scheduler, buffer manager, and transmit engines. Optionally, all or a portion of the various operations provided by the foregoing functional blocks may be implemented by appropriately-programmed logic embedded on an NPU or the like.

Thus, embodiments of this invention may be used as or to support firmware/software modules and/or programs executed upon some form of processing core or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

Although the various functional block architectures depicted herein correspond to NPU architectures, this is not meant to be limiting. These or similar functional blocks and associated operations may be implemented on other types of integrated circuits as well, such as, but not limited to, fabric interface chips (FICs).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
    employing queue descriptors to manage transfer of data from corresponding queues in a memory store into a switch fabric, each queue descriptor including,
        an enqueue pointer identifying a tail cell of a segment of data scheduled to be transferred from the queue;
        a schedule pointer identifying a head cell of the segment of data scheduled to be transferred from the queue; and
        a commit pointer identifying a most recent cell in the segment of data to be successfully transmitted into the switch fabric;
    receiving a schedule request to transfer a segment of data, the segment of data including a series of cells beginning at a head cell and ending at a tail cell;
    identifying a corresponding queue descriptor to manage the transfer of the segment of data, the queue descriptor including an enqueue pointer pointing to the tail cell;
    updating the schedule pointer of the corresponding queue descriptor to point to the head cell for the segment of data;
    transferring a first portion of the segment of data from a memory store into a transmit buffer;
    determining that a switch fabric into which the first portion of the segment of data is to be transmitted is available;
    transmitting the first portion of the segment of data from the buffer into the switch fabric;
    updating the commit pointer of the queue descriptor to indicate that the first portion of the segment of data has been successfully transferred;
    initiating transfer of a second portion of the segment of data from the memory store into the transmit buffer;
    determining that the switch fabric is not available to receive a transmission of the second portion of the segment of data; and
    performing a roll-back operation in response thereto, the roll-back operation including,
    dropping the second portion of the segment of data; and
    resetting the schedule pointer to point to the same cell as the commit pointer.

2. The method of claim 1, further comprising:
    rescheduling transfer of the second portion of the segment of data using the queue descriptor.

3. The method of claim 1, further comprising:
    dropping any cells in the second portion of the segment of data that are in transit from the memory store to the transmit buffer when the roll-back operation is initiated.

4. The method of claim 1, wherein a queue descriptor further includes:
    a scheduler cell count identifying a number of cells within a corresponding segment of data scheduled to be transferred; and
    a committed cell count identifying a number of cells within the segment that have been successfully transmitted into the switch fabric,
    wherein the committed cell count is updated in response to a successful transmission of one or more cells.

5. A method comprising:
    employing queue descriptors to manage transfer of data from corresponding queues in a memory store into a switch fabric, each queue descriptor including,
        an enqueue pointer identifying a tail cell of a segment of data scheduled to be transferred from the queue;
        a schedule pointer identifying a head cell of the segment of data scheduled to be transferred from the queue;
        a commit pointer identifying a most recent cell in the segment of data to be successfully transmitted into the switch fabric;
        a scheduler sequence number; and
        a committed sequence number,
    wherein the queue descriptor is used to manage transfer of a set of segments of data stored in a corresponding queue in a memory store, with the scheduler sequence number identifying a first segment of data scheduled to be transferred from the queue and the committed sequence number identifying a most recent segment of data to be successfully transmitted into the switch fabric;

transferring a plurality of segments of data from a memory store into a transmit buffer;

initiating transfer of the plurality of segments of data from the transmit buffer into a switch fabric;

determining, during the transfer, that the switch fabric is not available to receive a transmission of further segments of data; and performing a roll-back operation in response thereto, the roll-back operation including, dropping the portion of the segments of data that were transferred from the memory store into the transmit buffer but where not transmitted into the switch fabric; and updating the queue descriptor to reflect the portion of the segments of data that were dropped.

6. The method of claim 5, further comprising:

determining a first sequence number in a queue marked for segment drop; and storing the first sequence number as a restart sequence number.

7. The method of claim 5, further comprising:

resetting the scheduler pointer to point to the same cell as the commit pointer; and resetting the scheduler sequence number to equal the committed sequence number.

8. An apparatus, comprising:

a queue management engine, to manage transfer of data stored in memory queues into a switch fabric using corresponding queue descriptors, each queue descriptor including, an enqueue pointer identifying a tail cell of a segment of data scheduled to be transferred from the queue;

a schedule pointer identifying a head cell of the segment of data scheduled to be transferred from the queue; and a commit pointer identifying a most recent cell in the segment of data to be successfully transmitted into the switch fabric;

the queue management engine further being to receive a schedule request to transfer a segment of data, the segment of data including a series of cells beginning at a head cell and ending at a tail cell;

identify a corresponding queue descriptor to manage the transfer of the segment of data, the queue descriptor including an enqueue pointer pointing to the tail cell;

update the schedule pointer of the corresponding queue descriptor to point to the head cell for the segment of data;

transfer a first portion of the segment of data from a memory store into a transmit buffer;

determine that a switch fabric into which the first portion of the segment of data is to be transmitted is available;

transmit the first portion of the segment of data from the buffer into the switch fabric;

update the commit pointer of the queue descriptor to indicate that the first portion of the segment of data has been successfully transferred;

initiate transfer of a second portion of the segment of data from the memory store into the transmit buffer;

determine that the switch fabric is not available to receive a transmission of the second portion of the segment of data; and perform a roll-back operation in response thereto, the roll-back operation including, dropping the second portion of the segment of data; and resetting the schedule pointer to point to the same cell as the commit pointer;

a buffer manager, to manage transmit buffers in which data to be transferred is temporarily stored prior to being transmitted into the switch fabric; and a transmit engine, to effect transmission of data from the transmit buffers into the switch fabric.

9. The apparatus of claim 8, further comprising:

a primary scheduler, to provide schedule request to the queue management engine, each schedule request to request transfer of a corresponding segment of data into the switch fabric.

10. The apparatus of claim 8, wherein the apparatus comprises a network processor unit further including a plurality of compute engines.

11. The apparatus of claim 10, wherein at least a portion of the operations performed by at least one of the queue management engine, buffer manager, and transmit engine is effected via execution of corresponding instruction threads on selected compute engines.

12. The apparatus of claim 8, wherein a queue descriptor further includes:

a scheduler sequence number; and a committed sequence number, wherein the queue descriptor is used to manage transfer of a set of segments of data stored in a corresponding queue in a memory store, with the scheduler sequence number identifying a first segment of data scheduled to be transferred from the queue and the committed sequence number identifying a most recent segment of data to be successfully transmitted into the switch fabric.

13. The apparatus of claim 8, wherein the apparatus comprises a fabric interface chip.

14. A network line card, comprising:

a circuit board including a backplane interface having a plurality of signal lines, at least a portion of which may be used to transfer data and control signals to a switch fabric;

a static random access memory (SRAM) memory store, operatively-coupled to the circuit board;

a dynamic random access memory (DRAM) memory store, operatively-coupled to the circuit board;

a network processor unit, operatively-coupled to the circuit board and including, a plurality of compute engines, each to support execution of a plurality of instruction threads;

a DRAM interface, communicatively-coupled to the plurality of compute engines and the DRAM store;

as SRAM interface, communicatively-coupled to the plurality of compute engines and the SRAM store;

a media switch fabric interface, communicatively-coupled to the plurality of compute engines and the backplane interface;

a plurality of transmit buffers, communicatively coupled to the media switch fabric interface or integrated therewith; and at least one non-volatile storage device, integrated on the NPU or operatively-coupled to the circuit board and communicatively-coupled to the NPU, to store instructions that if executed on selected compute engines facilitates operation of a plurality of operational blocks, including, a queue management engine, to manage transfer of data stored in memory queues in the DRAM store into a switch fabric using corresponding queue descriptors, each queue descriptor including,
   an enqueue pointer identifying a tail cell of a segment of data scheduled to be transferred from the queue;
   a schedule pointer identifying a head cell of the segment of data scheduled to be transferred from the queue; and
   a commit pointer identifying a most recent cell in the segment of data to be successfully transmitted into the switch fabric;
the queue management engine further being to
   receive a schedule request to transfer a segment of data, the segment of data including a series of cells beginning at a head cell and ending at a tail cell;
   identify a corresponding queue descriptor to manage the transfer of the segment of data, the queue descriptor including an enqueue pointer pointing to the tail cell;
   update the schedule pointer of the corresponding queue descriptor to point to the head cell for the segment of data;
   transfer a first portion of the segment of data from a memory store into a transmit buffer;
   determine that a switch fabric into which the first portion of the segment of data is to be transmitted is available;
   transmit the first portion of the segment of data from the buffer into the switch fabric;
   update the commit pointer of the queue descriptor to indicate that the first portion of the segment of data has been successfully transferred;
   initiate transfer of a second portion of the segment of data from the memory store into the transmit buffer;
   determine that the switch fabric is not available to receive a transmission of the second portion of the segment of data; and
   perform a roll-back operation in response thereto, the roll-back operation including,
      dropping the second portion of the segment of data; and
      resetting the schedule pointer to point to the same cell as the commit pointer
   a buffer manager, to manage the plurality of transmit buffers into which data to be transferred is temporarily stored prior to being transmitted into the switch fabric; and
   a transmit engine, to effect transmission of data from the transmit buffers into the switch fabric.

15. The network line card of claim 14, wherein the network line card comprises an Advanced Switching (AS) endpoint.

16. The network line card of claim 14, wherein a queue descriptor further includes:
   a scheduler sequence number; and
   a committed sequence number,
   wherein the queue descriptor is used to manage transfer of a set of segments of data stored in a corresponding queue in the DRAM store, with the scheduler sequence number identifying a first segment of data scheduled to be transferred from the queue and the committed sequence number identifying a most recent segment of data to be successfully transmitted into the switch fabric.

* * * * *